(12) United States Patent
Atzmon et al.

(10) Patent No.: US 9,619,405 B2
(45) Date of Patent: Apr. 11, 2017

(54) DEVICE HAVING MEMORY ACCESS PROTECTION

(71) Applicants: Nir Atzmon, Netanya (IL); Eran Glickman, Rishon le Zion (IL); Tal Siton, Kiryat Ono (IL)

(72) Inventors: Nir Atzmon, Netanya (IL); Eran Glickman, Rishon le Zion (IL); Tal Siton, Kiryat Ono (IL)

(73) Assignee: NXP USA, INC., Austin, TX (US)

( * ) Notice: Subject to any disclaimer, the term of this patent is extended or adjusted under 35 U.S.C. 154(b) by 233 days.

(21) Appl. No.: 14/551,577

(22) Filed: Nov. 24, 2014

(65) Prior Publication Data

US 2016/0147672 A1 May 26, 2016

(51) Int. Cl.
*G06F 12/00* (2006.01)
*G06F 12/14* (2006.01)

(52) U.S. Cl.
CPC ...... *G06F 12/14* (2013.01); *G06F 2212/1052* (2013.01)

(58) Field of Classification Search
None
See application file for complete search history.

(56) References Cited

U.S. PATENT DOCUMENTS

| | | |
|---|---|---|
| 4,434,464 A | 2/1984 | Suzuki et al. |
| 5,592,641 A | 1/1997 | Fandrich et al. |
| 7,380,120 B1 | 5/2008 | Garcia |
| 8,880,815 B2* | 11/2014 | Alexandron ............ G06F 12/02 711/154 |
| 2007/0283106 A1* | 12/2007 | Kalogeropulos ..... G06F 8/4442 711/154 |
| 2007/0283115 A1 | 12/2007 | Freeman et al. |
| 2009/0164753 A1* | 6/2009 | Jungwirth ........... G06F 9/30058 712/24 |

OTHER PUBLICATIONS

ITE Tech, Inc.: Datasheet IT85112E/F, Embedded Controller, Preliminary Specification 0.4.1, p. 62 of 335; ITE Tech. Inc., 2006, 3 pages.
National Semiconductor: Datasheet PC87591E, PC87591S and PC87591L LPC Mobile Embedded Controllers; Rev 1.07; Mar. 2004, "Host Controller Interface Modules" pp. 297-300; Mar. 2004, 6 pages.
National Semiconductor: PC87413, PC87414, PC87416, PC87417 LPC Server/O for Servers and Workstations, Rev. 1.1; Section 5.0 X-Bus Extension, pp. 91-114; Nov. 2001, 25 pages.

* cited by examiner

*Primary Examiner* — Brian Peugh (57) ABSTRACT

A device has a protection unit for controlling access to a memory. Indirect memory access requests have control data indicative of a memory access control register to be written to provide indirect access to a target memory and requested address data indicative of at least one memory address of the target memory to be accessed. The protection unit contains protection data defining access rights of source units to access specified address ranges of the target memory, and a system bus interface interfacing to a source unit and a memory bus interface interfacing to the target memory via a controller. The protection unit has a control monitor for detecting an indirect memory access request, and an indirect address monitor for comparing requested address data to specified address ranges and subsequently grant the indirect memory access in accordance with access rights of the respective source unit.

20 Claims, 5 Drawing Sheets

DEVICE HAVING MEMORY ACCESS PROTECTION

FIELD OF THE INVENTION

This invention relates to a system having an access protection unit for controlling access to a memory. The invention further relates to an integrated circuit comprising at least one such device, a processing system for processing data comprising at least one such device, a method of controlling access to a memory in a protection unit.

BACKGROUND OF THE INVENTION

In data processing systems a processor may be coupled to a memory via a system bus. The U.S. Patent Application U.S. 2007/0283115 describes memory protection in a computer system employing memory virtualization. A token based memory protection technique provides memory protection by assigning a unique identifier to an application, process or thread. The identifier is associated with a block of memory allocated to the application. A request to access a memory address may contain a token to be compared to the identifier that is assigned to the address range of the requested address. Hence access to address ranges in the memory is controlled via the token.

A drawback of such a device is that the memory protection is based on comparing the accessed address to the memory ranges as associated to respective identifiers.

SUMMARY OF THE INVENTION

The present invention provides a system having an access protection unit for controlling access to a memory as described in the accompanying claims. The invention further provides an integrated circuit comprising at least one such system, a processing system for processing data comprising at least one such device, a method of controlling access to a memory in a protection unit as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the figures, elements which correspond to elements already described may have the same reference numerals.

DETAILED DESCRIPTION OF THE PREFERRED EMBODIMENTS

In the examples in this document the device is used in a digital processor system for processing data, for example a vision application, but the device may be used in any other field requiring a processing of data using a memory that is accessed by multiple sources and needs to be protected against accidental or malicious use by some of the sources.

For example, a system on chip (SoC) may contain some basic components like a microcontroller, microprocessor or DSP core(s), memory blocks such as ROM, RAM and flash memory, external interfaces, including industry standards such as USB, Ethernet, SPI, and other standardized building blocks (SBB) for example provided via a design library, such as memory controllers, interrupt controllers, DMA controllers. Those components may be connected via system bus, which may be divided to sub-buses: address bus, data bus and control bus.

Memories are used to store data, and may be internal (inside a SoC) or external. The memory may contain a code to be executed or a data to be processed, or temporary data to be transferred from one location to another. Memory may be accessed via a memory controller. A block of memory may be a memory mapped address range (direct mapped addresses). Alternatively, a memory may be accessed by indirect memory access via a memory controller that facilitates the memory access.

Figure 1:
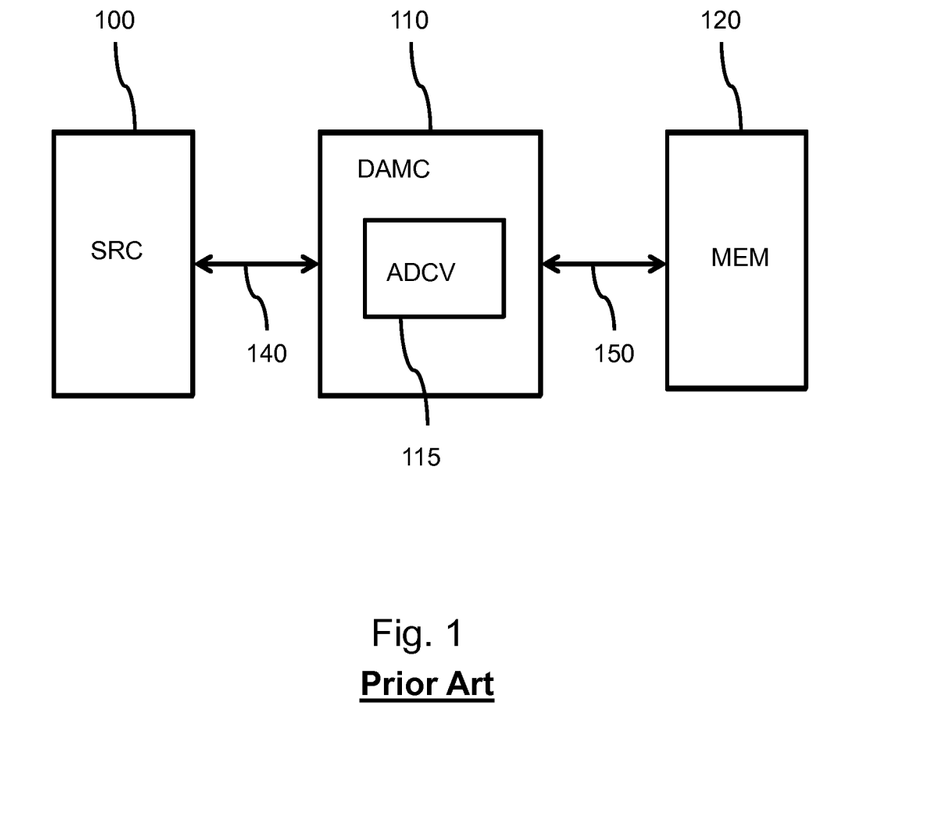
FIG. 1 shows an example of a processing system having direct access to a memory.

FIG. 1 shows an example of a processing system having direct access to a memory. In the system a source SRC 100 is coupled via a system bus 140 to a direct access memory controller DAMC 110. The direct access memory controller is coupled to a memory MEM 120 via a memory control interface 150. The direct access memory controller has an address converter ADCV 115 for converting the address on the system bus to a local address for the memory on the memory control interface. The memory control interface may further have memory data lines and memory control lines.

For direct memory access the source unit 100 (e.g. a processor core or SBB) initiates the transaction to the memory 120 and provides the requested address it wants to access on the address bus lines of the system bus. The system may further have data lines and control lines. The requested address may enter the direct access memory controller that controls the transaction to the memory model according to the requested address.

Another method to communicate with memory blocks through the memory controller is indirect access. An indirect access memory unit may have a set of configuration registers, which can be set to define required behavior of this unit. Writing to those registers the required data is done via a so-called system bus which may, for example, be a general purpose system bus, a register configuration bus or a system configuration bus. The system bus transfers the address of the required register inside the set of configuration registers, and the data to be read or written. The system bus may further have some control signals that indicate start of transaction to the registers, the start of transaction, an error which occurred at the transaction, etc.

Figure 2:
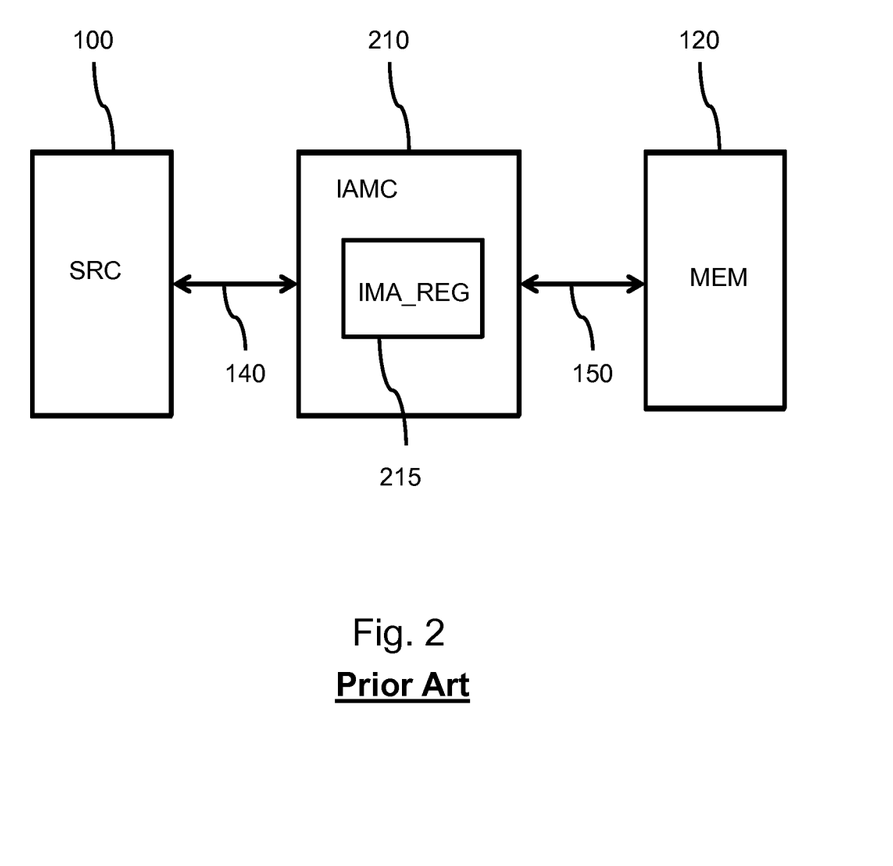
FIG. 2 shows an example of a processing system having indirect access to a memory.

FIG. 2 shows an example of a processing system having indirect access to a memory. In the system a source SRC 100 is coupled via a system bus 140 to an indirect access memory controller IAMC 210. The indirect access memory controller is coupled to a memory MEM 120 via a memory control interface 150. The indirect access memory controller has at least one indirect access control register IMA_REG 215, and may have further configuration registers. The IMA registers are written and/or read via the system bus. The IMA registers are for controlling the process of accessing the memory in an indirect way. Thereto the registers are constructed for receiving indirect memory access requests via the system bus so as to provide indirect memory access to the memory. The indirect memory access requests include control data indicative of the memory access control register to be written to provide access to the memory. The control data may be according to the address of the required IMA register (as part of the IMA registers sets, or configuration registers sets) driven from the source on the address bus of the system bus. Requested address data indicative of at least one memory address of the memory to be accessed may be the data driven on the data lines of the system bus. Based on said control data the requested address data is converted into a local address for the memory on the memory control interface. The memory control interface may further have memory data lines and memory control lines.

We may describe the indirect access request by two phases: an address phase and a data phase. At the address phase the source drives the address bus (part of the system bus) with the address of the required IMA register (as part of the IMA registers sets, or configuration registers sets) and drive the data bus with data equals to the memory address of the memory to be accessed. The control bus at this phase will be driven with signals for write transaction.

At the data phase the address bus (as part of the system bus) will be driven with the address of a different IMA register (as part of the IMA registers set or configuration registers set) which contains the data to be written to memory or read from memory. The control signals will indicate if write/read is requested, byte enable or any other additional control depending on the implementation. In the case of write the data bus at this phase will be driven from the source with the data to be written. In the case of read, the data will be first be read into the data register and subsequently moved to the data bus to complete the transaction. The requested address (which resides in the IMA register from the address phase) is converted into a local address for the memory on the memory control interface.

There are also other implementations for the indirect access. One embodiment will be adding another register which is IMA control register, in this case the address phase will be the same, the data phase in case of write will be the same, in case of read we will skip the data phase. A third phase (control phase) is added, at this phase the source writes to the IMA control register which has a specific bit which selects between read and write.

Another example will be that the IMA register (written at the address phase) will have a control bit, and in the case of read this will initiate the internal transaction at the address phase. In this case the data can be read or written by the second IMA register as described above.

We will now describe a 2 phase method implementation of indirect access. For indirect access, as shown in FIG. 2, the source may write to a set of registers, called Indirect memory address registers IMA_REG. The registers may be part of a set of configuration registers inside an indirect memory controller. The IMA registers will receive requested address data (at the address phase) that is to be used as address for a target memory associated with the controller via a local memory interface. So if a source needs to access the memory, the source will actually write the IMA registers at the address phase. The data phase may include an access type like read and/or write, or this may be derived from further control lines or additional data.

For example, a processing module can have a large memory array connected to two IMA registers, an address register and a data register. When a user wishes to write to a certain internal address inside the memory array, he will configure the address inside the address register and write to the data register the required data. The write transaction will initiate an internal write to the memory. Further data may be written to the data register to access a range of consecutive addresses in the memory array. Similarly, when doing a read access, the external transaction will be completed only when the internal read from the target memory is done and the read register is updated. Subsequent addresses may be read from the data register to retrieve a block of data.

Internal and external memory resources (e.g DRAM, Register banks) are often partitioned between different security levels. Known security policy enforcement blocks may use the source security level and the target address to allow or block accesses to the memory. This method works for memory-mapped targets or direct memory access as described with FIG. 1 above. However, such method fails when trying to partition memories that can be accessed by indirect memory access, e.g. block based devices, as described above with FIG. 2. During indirect memory access, all sources (privileged and non-privileged) write to the same set of registers and the final memory address is hidden in the transaction data. Existing security policy enforcers cannot block non-privileged sources from writing into these registers addresses which belong to restricted memory regions.

There are several methods to allow or block access to an entire memory space by allowing access only to privileged sources, regardless of the target memory address. However, when partitioning of a memory space is required between restricted and non-restricted space, the Protection Policy Enforcer needs to observe and evaluate the target memory address. The Protection Policy Enforcer may be a shared resource in a system on chip (SoC) and may not be instantiated per SBB but rather monitor the system bus. Indirect memory access may fool the existing memory enforcer modules and may result in a security breach since it can't distinguish between the security levels based on the transactions to the indirect memory access; a transaction to an allowed source or a forbidden one looks the same as an allowed one. So the prior art deals with either protection of address mapped memories, where the access is allowed or denied based on the target address arriving from the source, or with globally enabling access to specific blocks within the memory array, but does not support selective indirect access based on the source of the access.

The proposed system described now adds the capability to partition memory spaces that are accessible using indirect memory access. The system enables partitioning of block-based devices between restricted and non-restricted regions. This can be used, for example, to allocate a segment of a non-volatile memory (e.g. NAND flash), which is accessible via indirect access controller, for privileged use only while the rest can be used by non-privileged users.

Figure 3:
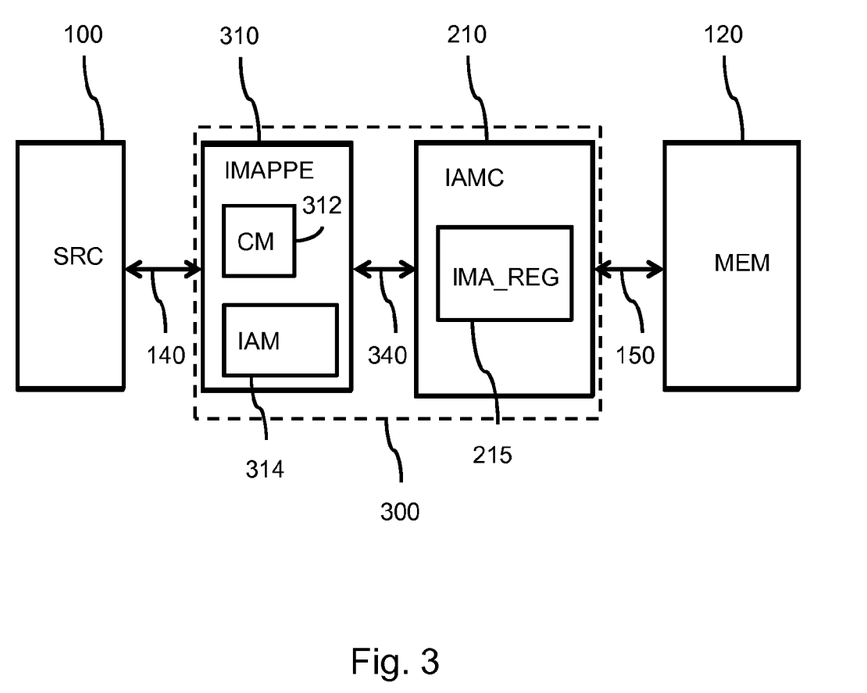
FIG. 3 shows an example of a protection unit for controlling indirect access to a memory in a processing system having indirect access to a memory.

FIG. 3 shows an example of device having a protection unit for controlling indirect access to a memory in a processing system having indirect access to a memory. The system may have the same components as the system described above with FIG. 2, while a protection unit 310, also called an indirect memory access protection policy enforcer IMAPPE, is added. The effect is that any indirect memory access of a source is now controlled according to a protection policy, which protection policy is expressed by access rights for specific source units. Thereto the IMAPPE detects the indirect memory access request and identifies the source that issues the indirect memory access request. Subsequently the control data included in the indirect memory access request (at the address phase) are compared to the access rights for identified source unit. Access to the memory is blocked when the comparison shows that the access rights do not allow the access as requested, so the protection policy is enforced.

A source SRC 100 is coupled to a system bus 140. The system bus may be a register configuration bus, a system configuration bus, or a general system bus that is also coupled to further system elements. The device 300 has a protection unit 310, which has a system bus interface arranged to interface to at least one source unit via the system bus 140 and a memory bus interface arranged to interface to at least one target memory via a memory bus 340. The memory bus may be identical in structure to the system bus. In the system the memory bus 340 may be coupled to an indirect access memory controller IAMC 210. The indirect access memory controller is coupled to a memory MEM 120 via a memory control interface 150. The indirect access memory controller is described above with FIG. 2.

The device 300 as shown includes the indirect access memory controller 210. However, functions of the indirect access memory controller may also (partly or completely) be implemented in a separate device, or in a target memory that is directly coupled to the memory bus, e.g. a flash type memory. Alternatively, the device 300 may also contain one or more source units and/or memories, e.g. to constitute a system on chip. Furthermore, system bus data lines may be directly connected to the indirect access memory controller IAMC 210, whereas system bus control lines and address lines may be connected only to the IMAPPE which provides control lines and address lines for the memory bus, e.g., protected versions of the original system bus control lines and address lines, to the indirect access memory controller IAMC 210.

The IMAPPE has storage to contain protection data defining access rights of source units to access specified address ranges of the target memory. The specified address ranges may also be called partitions. The IMAPPE has a control monitor CM 312 to monitor the system bus for detecting a respective indirect memory access request issued by a respective source unit at the address phase. The requested address data is written to the IMA register at the address phase. The IMAPPE also has an indirect address monitor IAM 314 to, upon detecting the respective indirect memory access request, compare the requested address data of the respective indirect memory access request to specified address ranges that are present in the access rights of the respective source unit. If the requested address is in a non protected address range the indirect memory access will be granted to any source.

However, if the requested address is in one of the specified address ranges, the IAM will only grant the indirect memory access in accordance with respective access rights of the respective source unit. So subsequently granting the indirect memory access as requested by the respective indirect memory access request in accordance with respective access rights of the respective source unit means the following: blocking the indirect memory access when the requested address is within the specified address range and the access rights of the respective source issuing the request are insufficient, and enabling the indirect memory access when the requested address is within the specified address range and the access rights of the respective source issuing the request are sufficient, or when the requested address is outside any protected specified address range.

In an embodiment, the access rights comprise for a specific specified address range, a list of source units that are allowed to access the specific specified address range, and the indirect address monitor is arranged to only grant access when the comparison shows that the requested address is in the specific specified address range and the respective source unit is in the list of source units. Alternatively, the access rights may contain, for a specific source unit, a list of address ranges to which access is allowed for the specific source unit. Alternatively the access rights may contain a numeric table with a source level of security of each source and a memory region level for each protected memory region and compare between them. If the source has security level lower than the memory regions the access will be blocked. The access may also be limited to only write or only read from certain memory areas.

The IMAPPE may be integrated into an existing design. The IMAPPE is inserted between the system bus and an indirect memory access controller's configuration port. The Indirect Memory Access Protection Policy Enforcer IMAPPE blocks transactions from non-privileged sources that attempt to initiate an indirect memory access to restricted memory regions.

The IMAPPE may be implemented as a basic unit that services a single memory or memory controller, or a extended unit that may be placed in a complex system having different memory or register structures, e.g. at the root of a configuration tree, and so service multiple targets.

The IMAPPE is configured to identify access to registers IMA_REG in the indirect memory access controller that initiate an indirect memory access. When such transactions are detected, the IMAPPE checks if the data which the source attempts to write matches an address in one of the programmed memory partitions. Such programmed memory partitions are specified in the access rights of source units as specified address ranges of the target memory. When a match is detected, the IMAPPE verifies whether the source is allowed to access the specified range, and, if so, grants access, and if not, blocks the access.

In an embodiment, the protection data comprises a privilege level required for accessing a respective specified address range. The access rights may contain a privilege level for respective address ranges. The protection unit is arranged to determine a source privilege level. The indirect address monitor is arranged to grant the indirect memory access to the respective specified address range only if the source privilege level of the respective source unit is at least as high as the privilege level. When an indirect memory access request is detected, the IMAPPE compares a privilege level of the respective source issuing the transaction with the required privilege level of the target partition. The privilege level of a source may also be part of the access rights of the source units. If the privilege level indicates a prohibited access, e.g., the privilege level of the source is lower than the privilege level of the respective specified address range, the transaction is blocked. In all other cases, the transaction is allowed to proceed.

Figure 4:
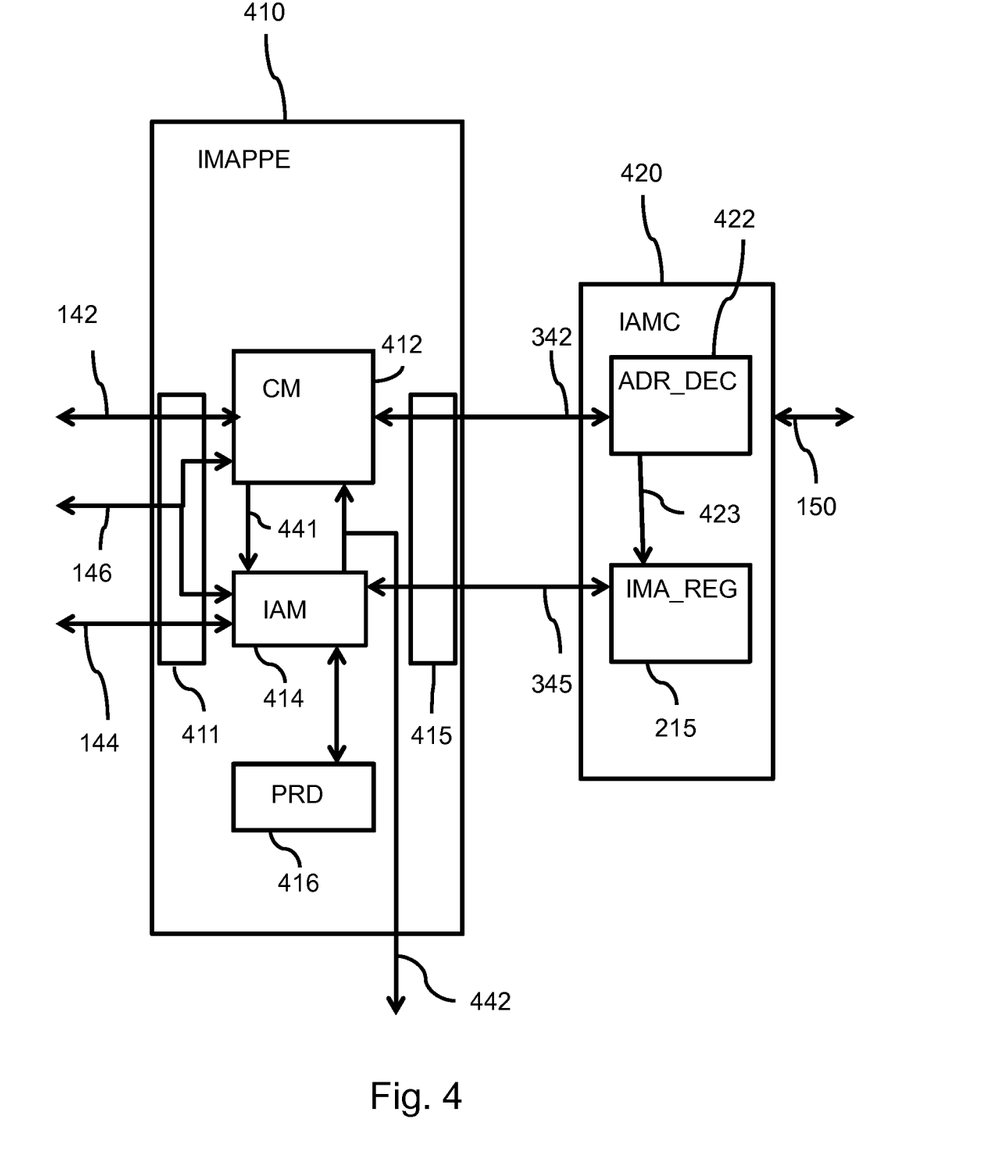
FIG. 4 shows an example of a protection unit for controlling indirect access to a memory and an indirect access controller.

FIG. 4 shows an example of a protection unit for controlling indirect access to a memory and an indirect access controller. A protection unit 410 called indirect memory access protection policy enforcer IMAPPE is for use in a processing system having indirect access to a memory. The system may have the same elements as described above. One or more source units may be coupled to a system bus that has address bus lines 142, control lines 146 and data bus lines 144, while the protection unit 410 has a system bus interface 411 arranged to interface to the system bus. The protection unit has a memory bus interface 415 arranged to interface to at least one target memory controller via a memory bus comprising memory bus address lines 342 and memory bus control and data lines 345. The memory bus may have an identical structure as the system bus The memory bus is coupled to an indirect access memory controller IAMC 420. The indirect access memory controller is coupled to one or more target memories via a memory control interface 150. The indirect access memory controller is similar to the IAMC described above with FIG. 2, and has at least one indirect access control register IMA_REG 215, and may have further configuration registers. The IMA registers are written and/or read via the memory bus as controlled by the IMAPPE. The indirect access memory controller has an address decoder 422 that receives the memory bus address lines 342 and contains address decode logic to decodes addresses. When decoding the dedicated address of the IMA_REG or further configuration registers, the registers are enabled to be written according to the memory bus control and data lines 345, as indicated by an arrow 423.

The IMAPPE has a control monitor CM 412 to monitor the system bus for detecting a respective indirect memory access request issued by a respective source unit. For example, the indirect memory access request may be detected by monitoring a specific address assigned to the IMA_REG of the indirect memory access controller.

The IMAPPE also has an indirect address monitor IAM 414 that is coupled to the control monitor. Upon detecting the respective indirect memory access request, the indirect address monitor compares requested address data of the respective indirect memory access request, e.g. received via system data bus lines 144, to specified address ranges.

In an embodiment, the protection unit has a memory for storing the protection data. The protection unit IMAPPE may have a storage unit PRD 416 arranged to contain protection data defining access rights of source units to access specified address ranges of the target memory. The storage unit may be a configuration register or programmable memory, or may be a fixed structure like a logical array programmed during manufacture, or a read-only memory.

In an embodiment, the control monitor 412 is arranged to provide a match signal 441, and the indirect address monitor is arranged to receive the match signal to enable comparing of the requested address data of the respective indirect memory access request to respective specified address ranges. So, upon detecting the specific address, the CM may generate the match signal 441. The indirect address monitor IAM 414 is coupled to the control monitor to receive the match signal 441. Upon detecting the respective indirect memory access request via the match signal, the indirect address monitor compares requested address data of the respective indirect memory access request.

The specified address ranges may be retrieved from the storage unit PRD 416 which stores the access rights of the respective source unit. The respective source unit may be identified, for example, by special control lines includes in the system bus control lines 146, or by an identifier included in the indirect memory access request, e.g. a target address or token. A source ID signal may have an identifier of the source, e.g. as part of the control bus. If the requested address is in a non protected address range the indirect memory access will be granted to any source. However, if the requested address is in one of the specified address ranges, the access will be blocked, unless the source unit as identified has sufficient access rights.

In an embodiment the indirect address monitor 414 is arranged to provide a violation signal upon said detecting and subsequently not granting the indirect memory access as requested by the respective indirect memory access request. If the requested address is in one of the specified address ranges and the source is not allowed to access that range, the IAM generates a violation signal 442. The CM now also blocks the indirect memory access in accordance with respective access rights of the respective source unit. The violation signal may be outputted on an output of protection unit and may be coupled to a security monitor, e.g. generating a high level interrupt for a system processor (not shown).

In a practical embodiment the IMAPPE 410 may contains two main logic blocks, a control monitor having address compare logic (ACL) and a indirect access monitor having data compare logic (DCL) The IMAPPE is configured to identify access to registers in a memory controller that initiate an indirect memory access. When such transactions are detected, the IMAPPE checks if data which the source attempts to write to set the registers, matches an address in one of the programmed memory partitions. When a match is detected, the IMAPPE compares the privilege level of the transaction source with a required privilege level of the target partition. If the privilege level indicates a prohibited access, the transaction is blocked.

In an embodiment, the control monitor is arranged to configure said detecting based on monitor configuration data. The control monitor may be arranged to receive the monitor configuration data via the system bus. For example, the control monitor may contain one or more registers which can be programmed by the monitor configuration data like addresses of registers in the Indirect Access Controllers to which the written data needs to be monitored (e.g. the address of the IMA registers, or other configuration registers). A match indication is passed to the Data Compare Logic.

In an embodiment, the indirect address monitor comprises a lookup table for storing the specified address ranges and corresponding access rights of source units. For example, the DCL may contain a lookup table, which can be register-based or a small RAM. The lookup table contains information on the memory region partitioning (e.g. base address/mask pairs). Upon receiving the match indication from the ACL, the DCL looks at the incoming data and compares to the values in the lookup table.

If a match is found and the privilege level of the incoming transaction is lower than that defined for the matched memory region, the DCL may issue a violation signal to the ACL. The ACL may block the transaction from proceeding. The DCL may also directly block the transaction. For example, the ACL may terminate the transaction by preventing the address and control signals to continue to the indirect memory controller.

In an embodiment, the IMAPPE may terminate the transaction by sending an appropriate control signal (e.g. end of transaction) to the source, and/or may send an error signal to the source. The control and error signals may depend on a configuration setting or protocol. In addition, the IMAPPE may drive out the violation signal to a security monitor. The violation signal may be monitored, or may generate an interrupt or an event to an interrupt controller that may inform a processor core. A software violation handler may change the program flow accordingly. In an embodiment the protection unit may block only read or only write transactions. Read access may, for example, be used for allowing status checking but no modification.

The proposed system is applicable to any application that must process and store secure data. A memory partition between several security levels may be needed for limiting access for unprivileged sources to sensitive program code or data. Using an indirect mapped access controller may also be profitable depends on architecture and/or availability of standardized building blocks. Flash memory controllers may use the indirect mapped access, for example when they communicate with the flash module via a standardized protocol such as SPI. In an embodiment the requested address may be sent bit by bit. The IMAPPE may be provided with a shift register to detect such addresses. In such systems the use of the IMAPPE will enable the partition of a memory block's segments to different security levels, and enforce the protection policy.

In an embodiment, the indirect memory access request comprises a source indication of the respective source unit, and the protection unit is arranged to retrieve the source indication. The respective indirect memory access request may for example have a field of a predetermined size which contains a number, identifier or address of the source. In an embodiment, the control monitor may be arranged to adapt said detecting based on the source indication. For example, the source indication may trigger a particular type of detecting for the respective source. Furthermore, the indirect address monitor may be arranged to adapt said comparing based on the source indication. For example, the source indication may indicate a source that has reading rights for all memory addresses. Now, for a read request, no further comparing is required, and unlimited access may be granted. In a further example, the source indication may indicate a source that has no writing rights at all. Now, for any write request, no further comparing is required, and access is denied.

In an embodiment, the protection data comprises a specified access type for accessing a specified address range. The indirect address monitor is arranged to retrieve the specified access type, and verify the type of the access request. The indirect address monitor only grants the indirect memory access to the respective specified address range if the indirect memory access request has an access type allowed by the specified access type. For example, the specified access type is one of the following types: read access, write access, and full access including read and write access.

In an embodiment, a device comprises the protection unit 310,410 as described above. Furthermore, such a device may also comprise the indirect access memory controller 210,420. Alternatively, or additionally, the device may comprise one or more memory blocks coupled to the memory bus. Furthermore, the device may include one or more source units coupled to the system bus, and/or further processing units, logical or analog circuits. An integrated circuit may comprise any one of the above devices.

In an embodiment, a processing system for processing data comprises at least one device as described above, and at least one source unit coupled to the system bus and at least one target memory coupled to the memory bus.

Figure 5:
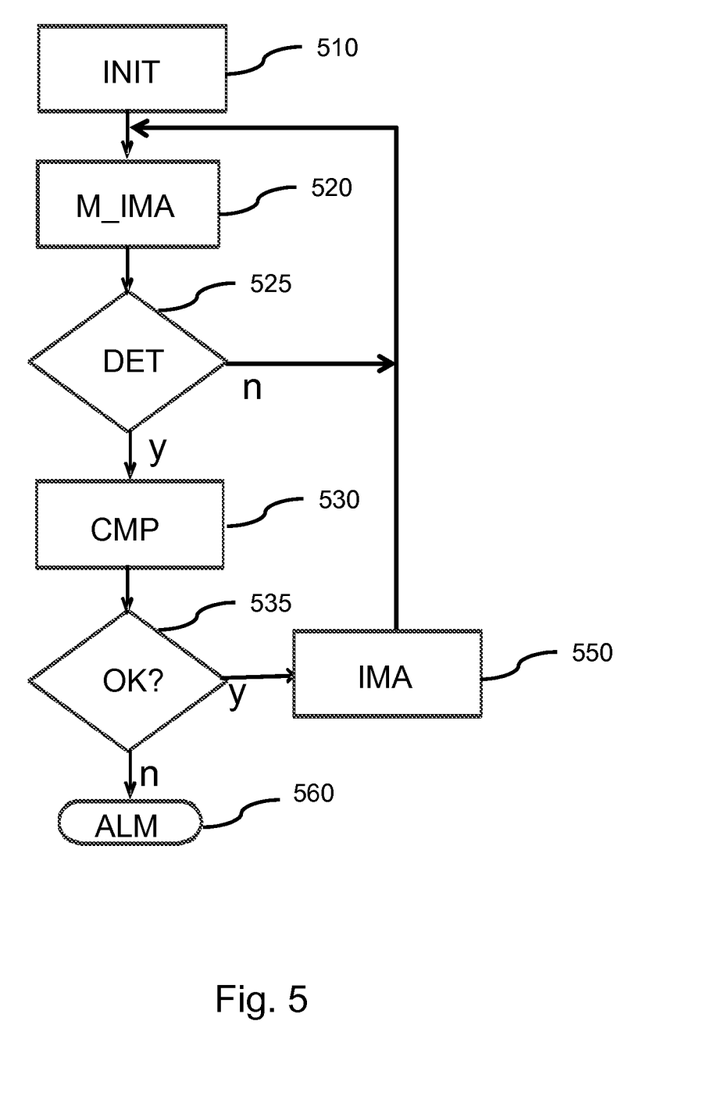
FIG. 5 shows an example of a method of controlling access to a memory.

FIG. 5 shows an example of a method of controlling access to a memory. The method may be used in any of the devices as described above. The protection unit has a system bus interface arranged to interface to at least one source unit via a system bus and a memory bus interface arranged to interface to at least one target memory via a memory bus. Indirect memory access requests on the system bus provide indirect memory access to the target memory. The indirect memory access requests comprise control data indicative of a memory access control register to be written to provide access to the target memory and requested address data indicative of at least one memory address of the target memory to be accessed. The protection unit is arranged to contain protection data defining access rights of source units to access specified address ranges of the target memory The method starts at stage INIT 510 by initializing the system, e.g. powering on and/or configuring the protection data defining access rights. Next, in a monitor stage M_IMA 520 the system bus is monitored for detecting a respective indirect memory access request issued by a respective source unit. When in stage DET 525 such an indirect memory access request is detected, a compare stage CMP 530 is entered. If not the process continues at the monitoring stage 520.

In the compare stage CMP the requested address data is retrieved from the respective indirect memory access request, and is compared to respective specified address ranges as defined in the protection data. When in stage OK? 535 the comparison indicates that the address may be accessed by the respective source, a next stage IMA 550 is entered which allows the indirect access to proceed by granting the indirect memory access in accordance with respective access rights of the respective source unit. If not the process continues at the alarm stage ALM 560. In the alarm stage the indirect memory access is blocked and a violation signal may be generated.

In the foregoing specification, the invention has been described with reference to specific examples of embodiments of the invention. It will, however, be evident that various modifications and changes may be made therein without departing from the broader spirit of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system, comprising:
a system bus connectable to a target memory and to a source of indirect memory access requests, the indirect memory access requests comprising control data indicative of a memory access control register to be written to provide access to the target memory and requested address data indicative of at least one memory address of the target memory to be accessed, and
a protection unit for controlling access to the target memory, comprising:
a data storage for containing protection data defining access rights of source units to access specified address ranges of the target memory,
a system bus interface arranged to interface to at least one source unit via the system bus and a memory bus interface arranged to interface to the target memory via a memory bus,
a control monitor to monitor the system bus for detecting a respective indirect memory access request issued by a respective source unit, and
an indirect address monitor arranged to, upon said detecting, compare requested address data of the respective indirect memory access request to respective specified address ranges and subsequently grant the indirect memory access as requested by the respective indirect memory access request in accordance with respective access rights of the respective source unit.

2. System as claimed in claim 1, wherein the access rights comprise, for a specific specified address range, a list of source units that are allowed to access the specific specified address range, and the indirect address monitor is arranged to only grant access when the comparison shows that the requested address is in the specific specified address range and the respective source unit is in the list of source units.

3. System as claimed in claim 1, wherein the indirect address monitor is arranged to provide a violation signal upon said comparing and subsequently not granting the indirect memory access as requested by the respective indirect memory access request.

4. System as claimed in claim 1, wherein the control monitor is arranged to provide a match signal upon said detecting, and the indirect address monitor is arranged to receive the match signal to enable said comparing of the requested address data of the respective indirect memory access request to respective specified address ranges.

5. System as claimed in claim 1, wherein the control monitor is arranged to configure said detecting based on monitor configuration data.

6. System as claimed in claim 5, wherein the control monitor is arranged to receive the monitor configuration data via the system bus.

7. System as claimed in claim 1, wherein the protection unit comprises a memory for storing the protection data.

8. System as claimed in claim 1, wherein the respective indirect memory access request comprises a source indication of the respective source unit, and the protection unit is arranged to retrieve the source indication.

9. System as claimed in claim 8, wherein the control monitor is arranged to adapt said detecting based on the source indication.

10. System as claimed in claim 9, wherein the indirect address monitor is arranged to adapt said comparing based on the source indication.

11. System as claimed in claim 1, wherein the protection data comprises a privilege level required for accessing a respective specified address range, and the indirect address monitor is arranged to grant the indirect memory access to the respective specified address range only if a source privilege level of the respective source unit is at least as high as the privilege level.

12. System as claimed in claim 1, wherein the indirect address monitor comprises a lookup table for storing the specified address ranges and corresponding access rights of source units.

13. System as claimed in claim 1, wherein the protection data comprises a specified access type for accessing a specified address range, and the indirect address monitor is arranged only to grant the indirect memory access to the respective specified address range if the indirect memory access request has an access type allowed by the specified access type.

14. System as claimed in claim 13, wherein the specified access type comprises one of read access, write access, and full access including read and write access.

15. System as claimed in claim 1, comprising the at least one target memory coupled to the memory bus.

16. System as claimed in claim 1, comprising the at least one source unit coupled to the system bus.

17. Integrated circuit comprising at least one device according to claim 1.

18. Processing system for processing data comprising at least one device according to claim 1, and the at least one source unit coupled to the system bus and the at least one target memory coupled to the memory bus.

19. Method of controlling access to a memory in a protection unit,
indirect memory access requests as transferred via a system bus providing indirect memory access to a target memory, the indirect memory access requests comprising control data indicative of a memory access control register to be written to provide access to the target memory and requested address data indicative of at least one memory address of the target memory to be accessed,
the protection unit being arranged to contain protection data defining access rights of source units to access specified address ranges of the target memory,
the method comprising
monitoring the system bus for detecting a respective indirect memory access request issued by a respective source unit, and
comparing, upon said detecting, requested address data of the respective indirect memory access request to respective specified address ranges and subsequently granting the indirect memory access as requested by the respective indirect memory access request in accordance with respective access rights of the respective source unit.

20. Method as claimed in claim 19, said granting comprising blocking the indirect memory access when the requested address is within the specified address range and the access rights of the respective source issuing the request are insufficient, and enabling the indirect memory access when the requested address is within the specified address range and the access rights of the respective source issuing the request are sufficient, or when the requested address is outside any protected specified address range.

* * * * *